W. MOLESWORTH.
Dilators for Medical Purposes.

No. 157,343.  Patented Dec. 1, 1874.

Witnesses:—  Inventor:—

UNITED STATES PATENT OFFICE.

WILLIAM MOLESWORTH, OF NEW YORK, N. Y.

IMPROVEMENT IN DILATORS FOR MEDICAL PURPOSES.

Specification forming part of Letters Patent No. 157,343, dated December 1, 1874; application filed July 12, 1873.

*To all whom it may concern:*

Be it known that I, WILLIAM MOLESWORTH, M. D., in the county and city of New York and State of New York, have invented a certain new and useful Improvement in a Dilator for Dilating the Os and Cervix Uteri, Strictures of the Vagina, Anus, Urethra, Cervix Cystici, &c.; and the following is a full, clear, and exact description of the same, reference being had to the accompanying drawings making a part of this specification, in which—

Figure 1:
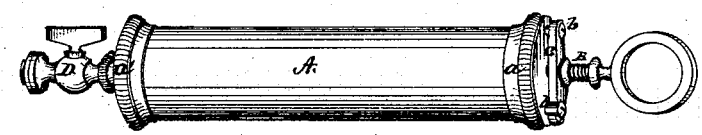
Figure 1:
Figure 2:
Figure 2:
Figure 3:

Figure 1 represents an exterior view of the force-pump, worked by screw-power, to operate the dilator by either air or water. Fig. 2 shows two of the tubes, of different sizes, to which the expansible dilator or tube is attached. Fig. 3 shows the expansible tubes when dilated.

My invention consists of pure elastic rubber tubes, of any required length or size, made by inserting lengthwise in the body of the rubber inelastic cords or strong threads, or small wires, on all the sides of the tube, so that it cannot elongate or expand in its length, but only in diameter, the same to be connected with flexible metal tubes, and operated by any syringe or force-pump, and expanded by either air or water forced into the dilator.

The following is a more general description of my dilator, referring to the drawings and the letters marked thereon:

The syringe or force-pump A is provided with a screw-rod, B, to operate the piston or plunger, and has a clasp-nut, C, to turn and lock under screws or knobs $b\ b$, attached to the screw-cap $a$, so that, by locking the clasp-nut C and turning the screw-rod B, the plunger is forced gradually and with great power to force the air or water into the dilator E′ through the tube E, and there held by the stop-cock D. By unlocking the clasp-nut C, the plunger is free to move, the same as an ordinary syringe or force-pump.

The dilator E′ is made of pure elastic india-rubber, and has inserted in the body of the sheet composing the tubes a series of inelastic cords, strong threads, or very small flexible wire, running longitudinally, to prevent the tube from lengthening, but does not in the least interfere with it expanding in diameter.

The advantage of my dilator is, that it can never expand lengthwise, or into small bags or pockets, but must uniformly expand only laterally.

What I claim as my invention is—

An elastic rubber dilator, furnished with a series of cords, thread, wire, or their equivalents, embedded in the rubber longitudinally, to prevent it from elongating or expanding except in its diameter, substantially as herein described, for the purposes set forth.

W. MOLESWORTH, M. D.

Witnesses:
JNO. D. PATTEN,
HARRY C. BIRCH.